United States Patent
Yuan et al.

(10) Patent No.: US 7,055,398 B2
(45) Date of Patent: Jun. 6, 2006

(54) APPARATUS AND METHOD OF BELT DYNAMIC TENSION MEASUREMENT

(75) Inventors: Jing Yuan, Rochester Hills, MI (US); Imtiaz Ali, Lathrup Village, MI (US); Joel Patrick Musyj, Amherstburg (CA)

(73) Assignee: The Gates Corporation, Denver, CO (US)

( * ) Notice: Subject to any disclaimer, the term of this patent is extended or adjusted under 35 U.S.C. 154(b) by 0 days.

(21) Appl. No.: 10/977,653

(22) Filed: Oct. 29, 2004

(65) Prior Publication Data
US 2005/0056100 A1   Mar. 17, 2005

Related U.S. Application Data

(62) Division of application No. 10/454,989, filed on Jun. 4, 2003, now abandoned.

(51) Int. Cl.
*G01L 3/00*   (2006.01)
(52) U.S. Cl. .................................. 73/862.08
(58) Field of Classification Search ............ 73/862.08, 73/862
See application file for complete search history.

(56) References Cited

U.S. PATENT DOCUMENTS

| | | | |
|---|---|---|---|
| 3,705,530 A | 12/1972 | White .................. 73/136 C |
| 3,902,363 A | 9/1975 | Ishimoto .................... 73/159 |
| 4,326,424 A | 4/1982 | Koenig .................. 73/862.48 |
| 4,691,579 A | 9/1987 | Ekola .................... 73/862.48 |
| 4,731,044 A * | 3/1988 | Mott ............................ 474/8 |
| 4,735,102 A | 4/1988 | Koenig ................. 73/862.48 |
| 4,784,004 A | 11/1988 | Ekola ................... 73/862.48 |
| 4,796,474 A | 1/1989 | Koenig ................. 73/862.65 |
| 4,821,583 A | 4/1989 | Richards .............. 73/862.48 |
| 4,899,599 A | 2/1990 | Eddens ................. 73/862.48 |
| 5,113,709 A | 5/1992 | Ekola ................... 73/862.48 |
| 6,173,801 B1 * | 1/2001 | Kakutani et al. ...... 73/862.333 |
| 6,216,547 B1 | 4/2001 | Lehtovaara ........... 73/862.391 |
| 6,324,919 B1 * | 12/2001 | Larsen et al. .......... 73/862.043 |
| 6,360,616 B1 | 3/2002 | Halliday et al. ......... 73/862.49 |
| 6,484,593 B1 | 11/2002 | Lehtovaara ........... 73/862.637 |

FOREIGN PATENT DOCUMENTS

JP    2001-099271    10/2001

* cited by examiner

*Primary Examiner*—Max Noori
(74) *Attorney, Agent, or Firm*—J. A. Thurnau, Esq.; C. H. Castleman, Esq.; J. L. Mahurin, Esq.

(57) ABSTRACT

A method and apparatus for measuring an operating front end accessory belt tension using a hubload transducer and a torque transducer. The hubload transducer comprises concentric rings with a strainable member disposed in a coplanar fashion between an inner and outer ring. The hubload transducer is used with a non-torque transmitting idler pulley. The torque transducer comprises a strainable cylindrical member connected to a belt bearing surface and a rotating shaft. The torque transducer will transmit a torque to a driven accessory. It is used on accessories such as an air conditioner compressor or power steering pump. Signals from the hubload transducer and torque transducer as used to calculate a drive efficiency as well as belt span tensions between the driver and driven accessories.

8 Claims, 10 Drawing Sheets

FIG.18

APPARATUS AND METHOD OF BELT DYNAMIC TENSION MEASUREMENT

REFERENCE TO RELATED APPLICATIONS

This application is a divisional of U.S. non-provisional application Ser. No. 10/454,989 filed Jun. 4, 2003 now abandoned.

FIELD OF THE INVENTION

The invention relates to an apparatus and method of belt dynamic tension measurement and more particularly to an apparatus and method of belt dynamic tension measurement for drive efficiency measurement using a hubload transducer and a torque transducer.

BACKGROUND OF THE INVENTION

Various strain measuring devices are known. They can generally comprise a strainable member to which a load is imparted and to which a strain gage is fixed. Among then are devices which comprise an annular gage ring having strainable beam members and flexing beam members. The flexible beam members interconnect ring portions.

Also among the known devices are dual beam sensing members which include spaced end wall members connected integrally by parallel spaced beam members, which beam members are relatively flexible or bendable in one direction only. One of the end walls is generally attached to a support structure and the other end wall is operatively or directly attached to a shaft.

Representative of the art is U.S. Pat. No. 6,216,547 (2001) to Lehtovaara which discloses a load sensor comprising an annular gauge ring comprising an annular inner ring portion and an annular outer ring portion and having strainable beam members and flexing beam members. The flexible beam members interconnect ring portions.

Reference is also made to applicant's copending U.S. patent application Ser. No. 10/262,035 filed Sep. 30, 2002 which discloses a hubload transducer having an strainable ring disposed in a coplanar manner between an inner ring and an outer ring.

Also know are pulleys for measuring torque loads comprising a cylindrical shape connected to a pulley with the other end connected to a shaft and having strain gages attached to the cylindrical shape.

Representative of the art is Japanese patent application publication number 2001099271 which discloses a cylindrical shape connected to a pulley with the other end connected to a shaft and having strain gages attached to the cylindrical shape.

The prior art does not teach hubload and torque transducers combined to operate on a system basis. Further, the hubload transducers are relatively complex comprising flexing beam members and strainable beam members. The prior art torque transducer lacks means to torsionally isolate the cylindrical portion from the other supporting structures.

What is needed is a method and apparatus for measuring an operating belt span tension using a hubload transducer and a torque transducer. What is needed is a method and apparatus for measuring a belt drive efficiency using a hubload transducer and a torque transducer. The present invention meets these needs.

SUMMARY OF THE INVENTION

The primary aspect of the invention is to provide a method and apparatus for measuring an operating belt span tension and a crankshaft torque using a hubload transducer and a torque transducer.

Another aspect of the invention is a provide a method and apparatus for measuring a belt drive efficiency using a hubload transducer and a torque transducer.

Other aspects of the invention will be pointed out or made obvious by the following description of the invention and the accompanying drawings.

The invention comprises a method and apparatus for measuring an operating front end accessory belt tension using a hubload transducer and a torque transducer. The hubload transducer comprises concentric rings with a strainable member disposed in a coplanar fashion between an inner and outer ring. The hubload transducer is used with a non-torque transmitting idler pulley. The torque transducer comprises a strainable cylindrical member connected to a belt bearing surface and a rotating shaft. The torque transducer will transmit a torque to a driven accessory. It is used on accessories such as an air conditioner compressor or power steering pump. Signals from the hubload transducer and torque transducer as used to calculate a drive efficiency as well as belt span tensions between the driver and driven accessories.

BRIEF DESCRIPTION OF THE DRAWINGS

The accompanying drawings, which are incorporated in and form a part of the specification, illustrate preferred embodiments of the present invention, and together with a description, serve to explain the principles of the invention.

DETAILED DESCRIPTION OF THE PREFERRED EMBODIMENT

Hubload Transducer

Figure 1:
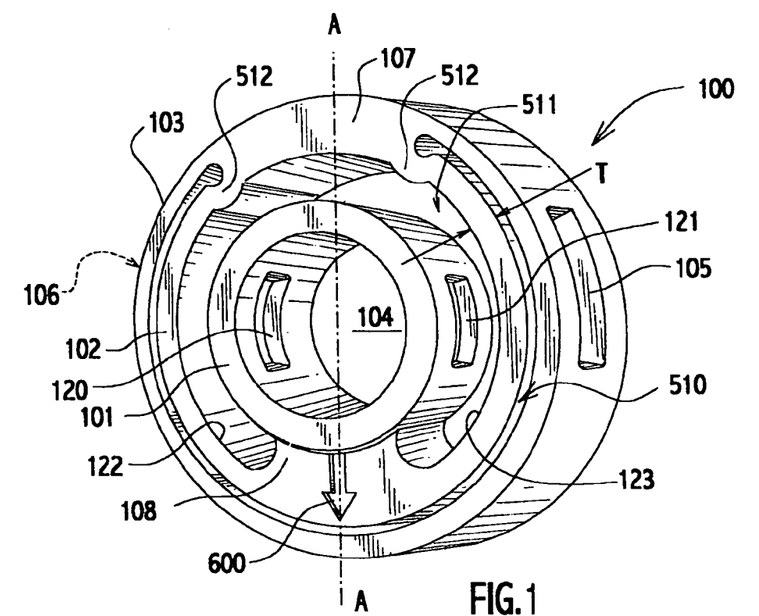
FIG. 1 is a perspective view of the hubload transducer.

FIG. 1 is a perspective view of the hubload transducer. The hubload transducer is relatively compact and may be used in a pulley to measure a shaft load or shaft dynamic behavior. This includes measuring a hubload and thereby a belt span tension. A hubload is a load applied to a pulley and its shaft by a belt tension in a belt drive system.

Transducer 100 generally comprises an arcuate inner member or hub ring 101, sensor ring 102 and arcuate outer member or outer ring 103. Hub ring 101 comprises a bore 104 which acts as a means for attaching the transducer to a mounting surface. A fastener such as a bolt engages hub ring 101 through bore 104 to connect the transducer to a mounting surface. Hub ring 101 is relatively rigid to provide a firm means of connecting the transducer to the mounting surface. Hub ring 101 may also comprise an integral shaft for attaching the hub ring to a mounting surface. Hub ring 101 is connected to sensor ring 102 by connecting portion or member 108.

Apertures 120 and 121 in each side of hub ring 101 provide access to an inner surface 122, 123, of sensor ring 102. Access through apertures 120 and 121 is used for mounting strain gages 302 and 303 to sensor ring 102. Use of apertures 120 and 121 is dependent upon the width of a slot 511. Incorporation of apertures 120 and 121 allows the width of slot 511 to be minimized to where sensor ring 102 would just avoid touching hub ring 101 at a hub ring lateral movement range limit, thereby allowing the an overall diameter of the transducer to be reduced over the prior art. For example, in the case where slot 511 is particularly narrow, for example less than approximately 2 mm, access for mounting a strain gage on sensor ring 102 would be very limited and perhaps would not otherwise be possible in the absence of apertures 120, 121.

Sensor ring 102 is connected between hub ring 101 and outer ring 103. Sensor ring 102 comprises an arcuate strainable member which concentrically cooperates with the arcuate shape of inner hub ring 101 and outer ring 103. The concentric relationship between the hub ring, sensor ring and outer ring allows the inventive transducer to have a minimal diameter, for example less than 60 mm, for use in confined areas, such as in a pulley.

Slot 510 is disposed between sensor ring 102 and outer ring 103. Slot 511 is disposed between sensor ring 102 and inner ring 101. Under load sensor ring 102 deforms to become elongated or elliptically shaped, having a major axis in direction A—A and a minor axis in direction B—B, see FIG. 3. A width of slot 511 is determined by a desired total deformation of sensor ring 102 in direction B-B when under load. A width of slot 511 is also a function of the thickness T of sensor ring 102. Thickness (T) is determined by the dynamic conditions to which the sensor ring is exposed, including maximum design load. Using finite element analysis, thickness (T) is optimized to give a good dynamic range under the expected loading conditions.

Figure 3:
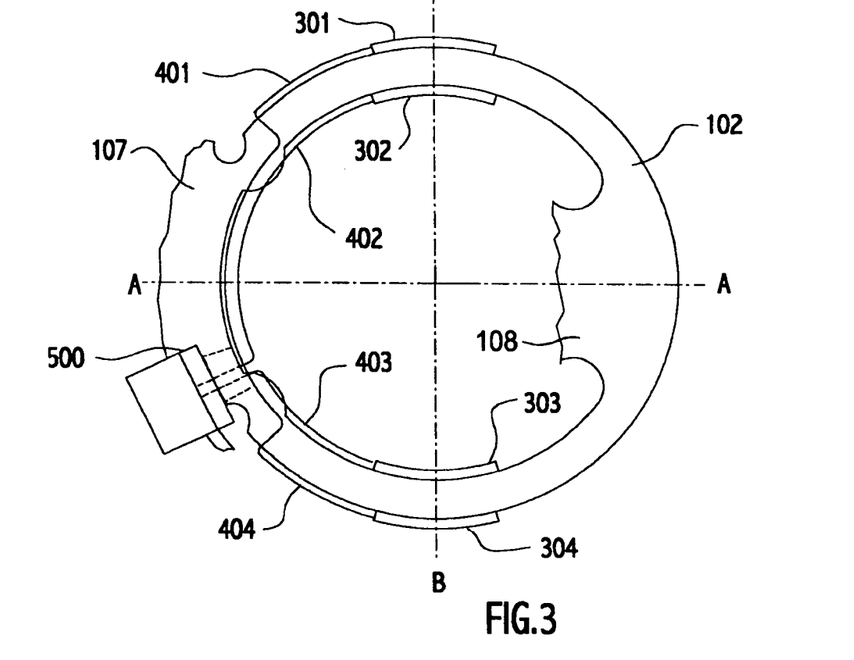
FIG. 3 is a plan view of the hubload transducer sensor ring.

At least one strain gage is attached to the sensor ring as described in FIG. 3. A hubload force vector is represented by vector 600. Sensor ring 102 is sufficiently flexible to cause a surface strain to be realized at a strain gage location upon application of a hubload to the hub ring. Sensor ring 102 is connected through arcuate connecting members 512 to outer ring 103 and portion 107. Portion 107 and connecting member 108 are disposed on substantially opposing sides of sensor ring 102. Connecting sensor ring 102 to outer ring 103 at members 512 enhances a deformation of sensor ring 102, and therefore enhances surface strains in sensor ring 102 when subjected to a hubload force 600 along axis A—A. Although vector 600 is showing having a particular direction, the transducer is capable of detecting loads having vectors in any direction. Of course, an overall sensitivity may be affected depending upon the spatial relationship between vector 600 and the strain gage(s) position with respect thereto. Hence, sensitivity of the transducer is optimized based upon the direction of vector 600 in relation to portion 107 and member 108, the position of the strain gages, and the thickness of sensor ring 102.

Each connecting member 512 partially deforms in conjunction with sensor ring 102 when the transducer is under load. Members 512 have a predetermined spring rate that is a function of the dynamic loading to be borne by the transducer, and more particularly, by sensor ring 102. The predetermined spring rate in turn determines an arcuate form of each member 512.

One can appreciate that during operation sensor ring 102 will be constantly subjected to vibrations and cyclic loading. This will in turn impose stresses on the connection between sensor ring 102 and outer ring 103. Hence, the arcuate form of members 512 enhances a transducer operating life by distributing and dispersing, thereby reducing, stress risers that might otherwise be present at a connection between the sensor ring 102 and the outer ring 103. This, in turn, minimizes potential fatigue cracking that may otherwise be caused by stress risers at the connection.

Apertures 105, 106 in outer ring 103 are used to facilitate installation of strain gages 301 and 304 on sensor ring 102, see FIG. 3. Access through apertures 105 and 106 is used for mounting strain gages 301 and 304 to sensor ring 102. Use of apertures 105, 106 is dependent upon the width of a slot 510. Incorporation of apertures 105 and 106 allows the width of slot 510 to be minimized to where sensor ring 102 would just avoid touching ring 103 at a sensor ring lateral movement range limit, thereby allowing the an overall diameter of the transducer to be reduced over the prior art. For example, in the case where slot 510 is particularly narrow, for example less than approximately 2 mm, access for mounting a strain gage on sensor ring 102 would be very limited and perhaps would not otherwise be possible in the absence of apertures 105, 106.

Bracket 500 may be used to accept a strain-gage signal conditioner. Bracket 500 is attached to outer ring 103. Bracket may be formed or cast as an integral part of outer ring 103 as well.

Outer ring 103 provides structural strength to the device as well as provides a means for engaging the transducer to a bearing and pulley. Outer ring 103 is press fit into a pulley bearing, which bearing is in turn engaged with a pulley for engaging a belt. Outer ring 103 is sufficiently rigid to permit rotational operation of a pulley about the transducer in a belt drive system.

Hub ring 101, sensor ring 102, and outer ring 103 are substantially coplanar. More particularly, each of the rings is concentrically nested within the other. Nesting the rings reduces a thickness of the inventive device to a minimum, thereby allowing use of the transducer in a pulley, for example, in an existing vehicle front end accessory drive where equipment space may be limited. The inventive transducer can be used to replace an existing pulley in a belt drive system, thus allowing retrofit for instrument installation with little or no modification to an existing system. The transducer may also be used in a tensioner between a tensioner pulley and tensioner arm on a tensioner pulley shaft in order to measure a shaft dynamic behavior or a tensioner arm dynamic behavior.

In the preferred embodiment the inventive transducer can be machined from a single piece of material, such as metal, including aluminum, steel, titanium, magnesium or combinations or alloys thereof. The device may also be cast, cut or molded from a suitable material such as plastic, ceramic, phenolic, or powdered metal depending upon the load to be borne by the transducer.

Figure 4A:
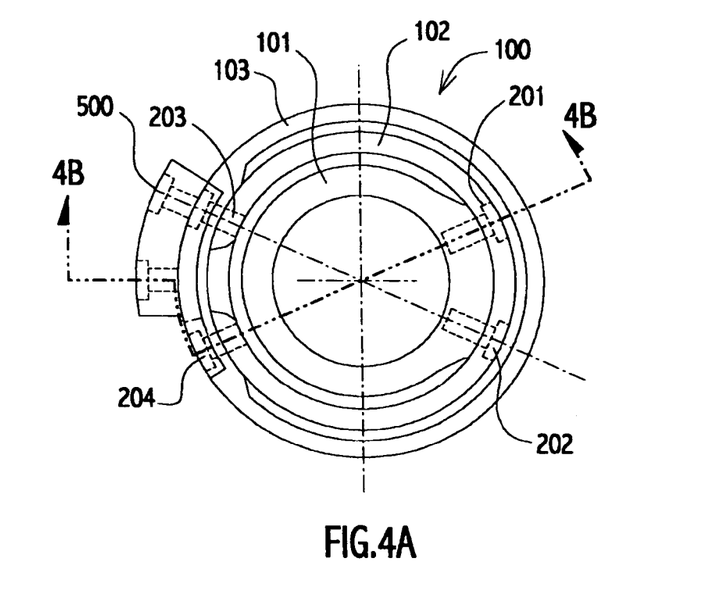
FIG. 4A is a plan view of the hubload transducer.

In another embodiment, it may comprise three pieces, i.e., hub ring, sensor ring, and outer ring joined by adhesives or screws, see FIG. 4a. In this embodiment, the hub ring and the outer ring comprise a ceramic material and the sensor ring comprises a metallic material. In yet another embodiment the hub ring and the outer ring may comprise a plastic material in particularly low load applications. The plastic need only have a sufficient modulus and have a sufficient resistance to the operating temperature of the engine to which it is mounted as well as the design load.

In yet another embodiment, the sensor ring and the outer ring comprise a single machined piece, with the hub ring attached by screws or adhesives to the sensor ring. In this embodiment the sensor ring and outer ring may comprise a metallic material and the hub ring may comprise a ceramic material. The hub ring may also comprise a plastic material in a relatively low load application. The plastic need only have a sufficient modulus and have a sufficient resistance to the operating temperature of the engine to which it is mounted.

Figure 2:
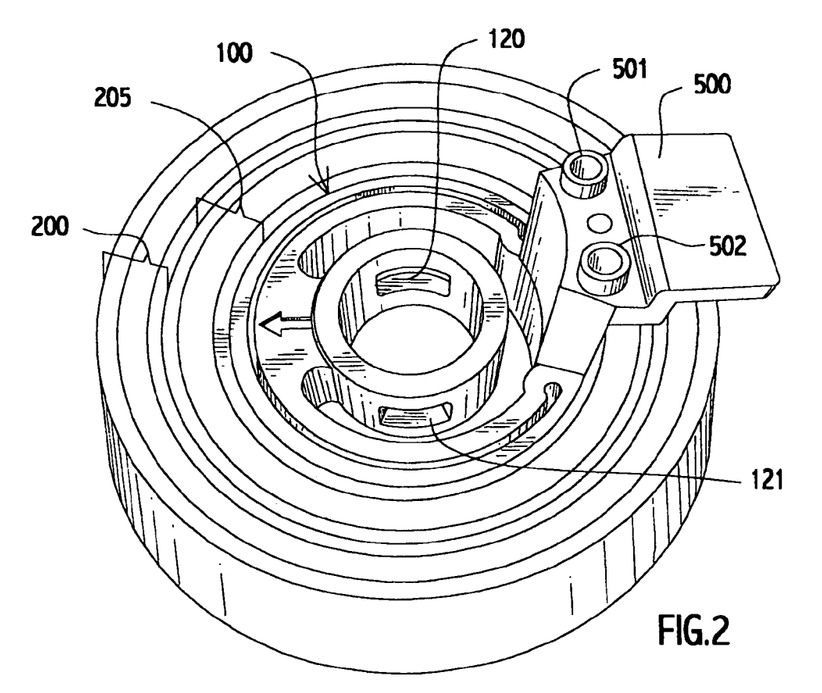
FIG. 2 is a perspective view of the hubload transducer.

FIG. 2 is a perspective view of the transducer. Transducer 100 is shown contained within a pulley 200. A bearing or bearings 205 are pressed onto the outside of outer ring 103 to occupy an annular space between outer ring 103 and pulley 200. Bracket 500 is attached to transducer 100 with fasteners 501, 502. Pulley 200 may have any belt bearing profile known in the art.

FIG. 3 is a plan view of the transducer sensor ring. Sensor ring 102 is shown with strain gages 301, 302, 303, 304 mounted thereto in a full bridge configuration. The strain gages are connected by wires 401, 402, 403, 404. Wires 402 and 403 are routed to bracket 500 for connection to an instrument lead wire. Strain gages 301 and 304 may be attached to sensor ring 102 through apertures 105 and 106. Strain gages 302 and 303 are mounted to sensor ring 102 through apertures 120, 121. The strain gages are oriented so that a force vector axis A—A is perpendicular to an imaginary line B-B between the strain gages. The strain gage full bridge configuration is substantially as described in FIG. 12 and FIG. 14.

FIG. 4A is a plan view of the hubload transducer. This is the embodiment using a separate hub ring 101, sensor ring 102 and outer ring 103 as described elsewhere herein. Sensor ring 102 is fastened to outer ring 103 using screws 203 and 204. Hub ring 101 is fastened to sensor ring 102 using screws 201 and 202. Other means of fastening the rings may comprise welding, adhesives, riveting, or other appropriate means known in the art. Screws 201, 202, 203, 204 are oriented as shown with respect to a hubload axis A—A.

Figure 4B:
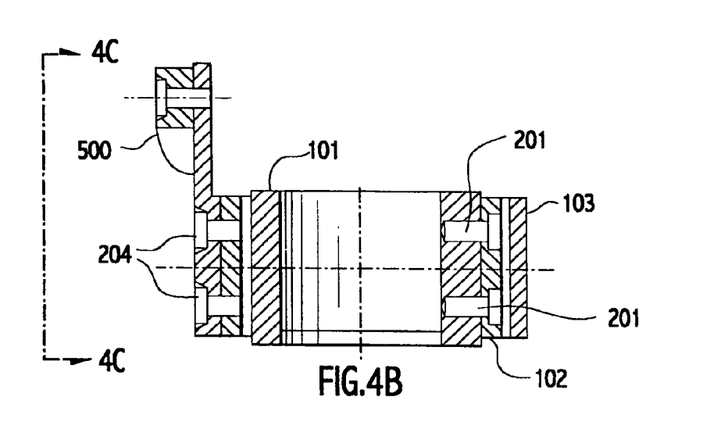
FIG. 4B is a cross-sectional view of FIG. 4A at line B—B.

FIG. 4B is a cross-sectional view of FIG. 4A at line 4B—4B. Screws 201 and 204 are shown connecting sensor ring 102 to outer ring 103. Bracket 500 provides a means to connect the strain gage wires to an instrument lead wire as described elsewhere herein.

Figure 4C:
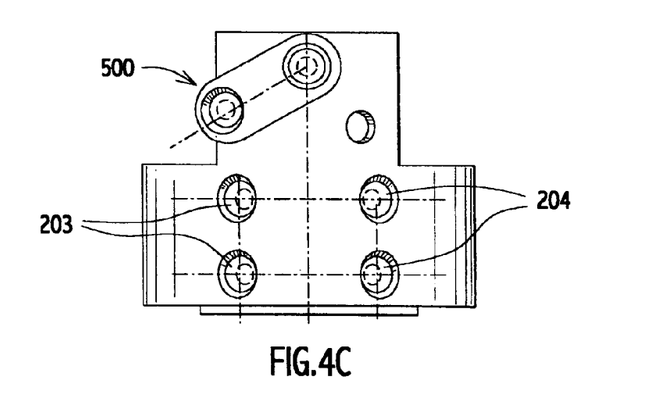
FIG. 4C is a side view at 4C—4C in FIG. 4B.

FIG. 4C is a side view at 4C—4C in FIG. 4B. Screws 203 and 204 are shown connecting outer ring 103 to sensor ring 102.

Figure 5:
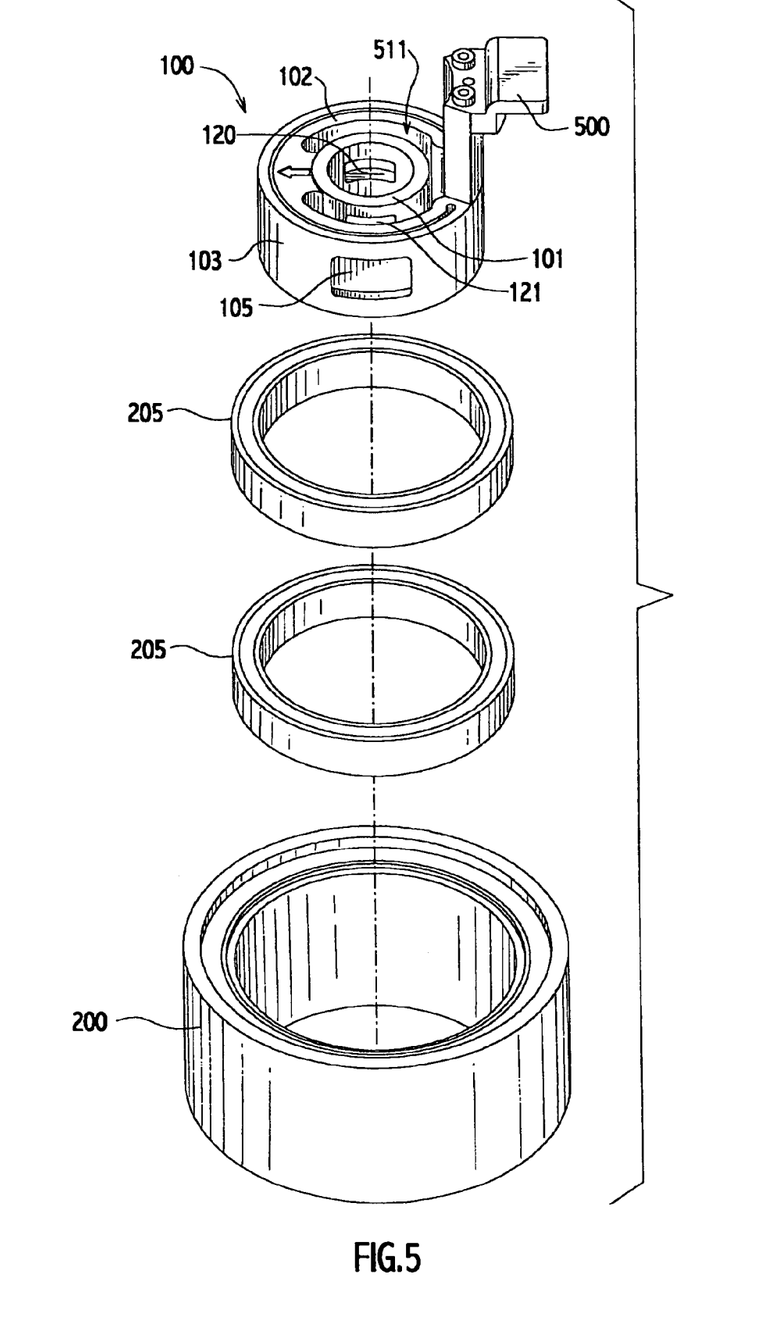
FIG. 5 is a perspective exploded view of the hubload transducer.

FIG. 5 is a perspective exploded view of the transducer. Bearings 205 are pressed on outer ring 103 of transducer 100. Pulley 200 is pressed onto bearings 205. Apertures 120 and 121 provide access for mounting strain gages on sensor ring 102.

Figure 6:
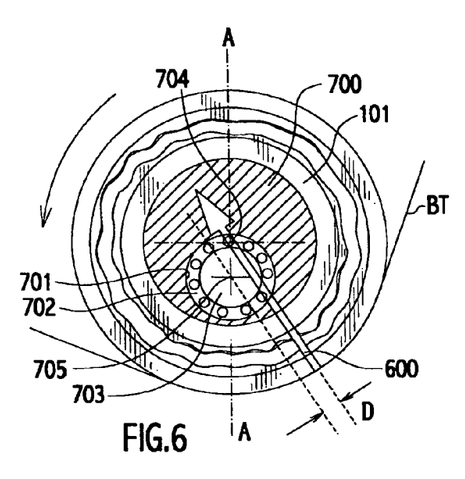
FIG. 6 is a partial plan view of the self-aligning portion of the hubload transducer.

FIG. 6 is a partial plan view of the self-aligning portion. In order to optimize a sensitivity of the transducer, it is desirable that the sensor ring be disposed to the hubload vector 600 such that vector 600 aligns with axis A—A, thereby aligning the strain gages with an axis B—B, see FIG. 3. This can be accomplished using a self-aligning member 700.

More particularly, an eccentric self-aligning member 700 is disposed in inner ring bore 104. By way of example and not of limitation, eccentric member 700 is press fit into bore 104. One can also appreciate that member 700 may also simply comprise an integral part of arcuate inner member 101, namely, arcuate inner member comprises a bore 701 having a center 705 which is not aligned with a transducer geometric center.

Eccentric member 700 comprises a bore 701. Center 705 of bore 701 is eccentrically disposed a distance from an eccentric member geometric center 704. Eccentric member geometric center 704 also coincides with a transducer geometric center and sensor ring geometric center. Bearing 702 is pressed into bore 701. A fastening member 703, such as a bolt, projects through and attaches bearing 702, and thereby the transducer, to a mounting surface (not shown). By action of bearing 702 the transducer is freely rotatable about fastening member 703.

In an exemplary situation, a hubload vector 600 is shown acting upon the transducer. The hubload is caused by a belt BT having a tension. In the exemplary configuration vector 600 is initially laterally offset from bore center 705 by a distance (D). Immediately upon application of a hubload 600, the self-aligning feature of member 700 operates to properly align the transducer. More particularly, distance (D) acts as a lever arm which causes a torque to be applied to eccentric member 700. The torque causes eccentric member 700, and thereby transducer 100 and sensor ring 102, to rotate about bearing 702 until vector 600 aligns with center 705, thereby eliminating the self-aligning torque and restoring equilibrium. This manner of operation of self-alignment applies regardless of the direction of vector 600.

Figure 7:
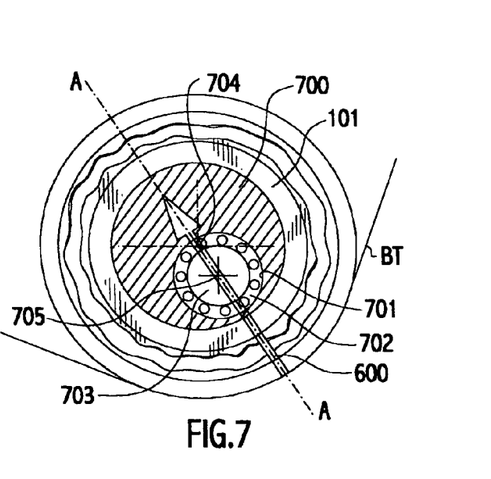
FIG. 7 is a partial plan view of the self-aligning portion of the hubload transducer.

FIG. 7 is a partial plan view of the self-aligning portion. Vector 600 is aligned with bore center 705. This orientation results in strain gages 301, 302, 303, 304 being in an optimum sensing position, that is, aligned with axis B-B as described in FIG. 3.

One can appreciate that the transducer can operate with or without the self-aligning member 700 as described in FIGS. 6 and 7. Use of the self-aligning member 700 depends upon a desired sensitivity and operating condition for the transducer. This may also depend in part upon a range of movement of vector 600 during operation. The sensitivity of the transducer is a function of the alignment of the strain gage(s) with a load vector 600. For example, if the inventive transducer is used with an idler with a narrow range of directions for vector 600, the need for the self-aligning member may be less important. In the alternative, where the transducer is used on a tensioner having a relatively large range of movement caused by a tensioner arm movement, use of the self-aligning member is advantageous to maintain a desired sensitivity for the transducer.

Figure 8:
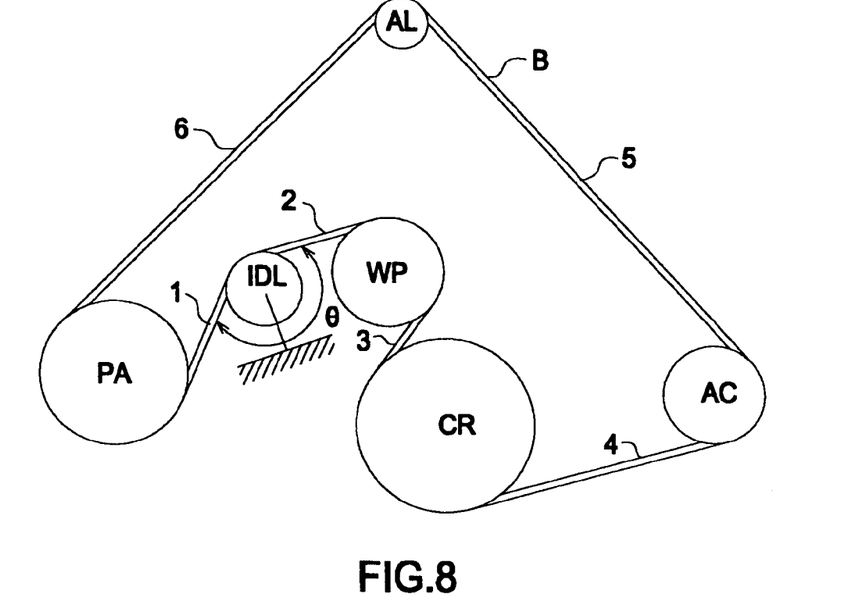
FIG. 8 is a schematic view of a belt accessory drive.

FIG. 8 is a schematic view of a belt accessory drive. With the development of multiple ribbed belts, the practice and usage of a single serpentine belt to drive the complete accessories, including air conditioning, power steering, alternator, and water pump has been widely adopted by the automotive industry. The drive described herein uses both the multiple-ribbed side and backside of the belt (B). This eliminates the need for multiple belts which otherwise would be needed to drive each accessory component, which in turn reduces the overall front to back engine dimension. A typical arrangement of a belt drive is shown in FIG. 8. More particularly, the pulley's are marked: alternator "AL", power assisted steering pump "PA", non-torque, no torque load transmitting tensioner idler "IDL", water pump "WP", crankshaft "CR", and air conditioner compressor "AC". Each of the belt spans between the pulleys are marked: PA to IDL "1", IDL to WP "2", WP to CR "3", CR to AC "4", AC to AL "5", AL to PA "6". For the purposes of this description a hubload transducer is mounted at the tensioner IDL. A torque transducer is mounted at AC, AL, PA and WP. Torques are transmitted at each accessory and CR.

Operating belt tension dynamic measurement means that the measurement is performed while the engine and belt is in operation. This as opposed to the so-called belt tension static measurement which is undertaken while the engine and belt are not in operation. In the case of the static measurement, using a tension meter, a span vibration frequency measurement technique known in the art, can be used to estimate the tension at each belt span by exciting an oscillation in each belt span.

The hubload transducer, as described in FIGS. 1–7 herein, is installed at the idler (IDL) pulley. No load (torque) is transmitted at the idler (IDL) pulley. A typical single serpentine belt accessory drive system will have at least one idler pulley for either belt routing or belt tension control. When the idler pulley is mounted on a tensioner, it is called "automatic tension control". On the other hand, when the idler pulley is mounted on a jackscrew assembly, it is called "fixed center tension control".

In principle, a belt span tension on either side of a pulley does not change from an initial installation tension when there is no torque transmitted by the pulley. Since no torque can be transmitted by the hubload transducer, a span tension on the both sides of the hubload transducer can be calculated as:

$$T1=T2=H/[2\sin(\theta/2)] \quad (1)$$

where, H is a belt hubload force measured by the hubload transducer, and $\theta$ is the belt wrap angle with dimension of degrees at this pulley. The belt wrap angle can be directly measured from the geometry of the layout. The hubload force measured by the transducer, H, is referred as the "baseline tension measurement". As described for FIGS. 1–7, the strain gages on the hubload transducer generate a signal which is fed to instruments known in the art, for example a signal conditioner/amplifier and oscilloscope or digital meter, which displays the hubload force in newtons. An exemplary strain gage signal conditioner/amplifier is an IO Tech strain gage module DBK43A™ 8-channel strain gage module displayed on the web at URL http://www.iotech.com/catalog/dag/catdbk43.html.

Unlike the hubload transducer, the torque transducer can transmit and measure a torque. When the torque is transmitted by a pulley, for example the pulley for the water pump WP, the tension difference at the torque transducer is:

$$T3-T2=2*Q/D \quad (2)$$

where Q is the torque in N-m measured at the torque transducer and D is the pulley pitch diameter in meters of the torque transducer. Typically the torque transducer to connected to a multiple-ribbed pulley for the maximum friction capacity. The torque value measured by the torque transducer is referred as the "incremental tension measurement".

The efficiency ($\eta$) of the belt drive is defined as:

$$\eta=([P\text{ output}]/[P\text{ input}])*100\%$$

where P input is power input and P output is power output. They are each defined as:

$$P\text{ input}=Q_{CR}*\omega_{CR}$$

$$P\text{ output}=(Q_{AC}*\omega_{AC})+(Q_{AL}*\omega_{AL})+(Q_{PA}*\omega_{PA})+(Q_{WP}*\omega_{WP})$$

Torques $Q_{CR}$, $Q_{AC}$, $Q_{AL}$, $Q_{PA}$, and $Q_{WP}$ are directly measured with torque transducers at each corresponding shaft. Rotational speed, in RPM, is measured at each corresponding shaft as well. Due to the relatively high efficiency of the subject belt pulley system, the quasi-energy conservation state can be closely achieved. Therefore, the total number of required torque transducers can be the total number of torque components minus one.

Conservation of energy requires that the total power input is equal to the total power output for the ideal situation which assumes no friction loss in the system.

$$Q_{CR}\omega_{CR}=Q_{AC}\omega_{AC}+Q_{AL}\omega_{AL}+Q_{PA}\omega_{PA}+Q_{WP}\omega_{WP}$$

where $\omega$ represents the rotational speed with dimensional units of radian/second.

Assuming there is no slip between the belt and each pulley, then:

$$\omega_{CR}*D_{CR}=\omega_{AC}*D_{AC}$$

$$\omega_{CR}*D_{CR}=\omega_{AL}*D_{AL}$$

$$\omega_{CR}*D_{CR}=\omega_{PA}*D_{PA}$$

$$\omega_{CR}*D_{WP}=\omega_{AC}*D_{WP}$$

Solving the energy conservation equation using the no-slip equations results in the crankshaft torque $Q_{CR}$ being expressed in terms of the component torques as:

$$Q_{CR}=Q_{AC}*D_{CR}/D_{AC}+Q_{AL}*D_{CR}/D_{AL}+Q_{PA}*D_{CR}/D_{PA}+Q_{WP}*D_{CR}/D_{WP} \quad (3)$$

It should be noted that the driver torque and driven torque will be denoted by "+" and "−" respectively when using equations (2) and (3). Where the driver torque is a crankshaft damper torque, and the driven torque is the particular components' torque, for example, air conditioner compressor, alternator, and so on. The crankshaft torque is calculated using equation (3). The baseline tension at span 1 and span 2 is calculated using baseline tension equation (1). Adjacent span tensions, e.g., spans 3 through 6 are calculated using torque transducer measurements using the incremental tension equation (2).

The following hypothetical values are randomly selected, not limiting, and are offered only for the purposes of illustrating the calculation procedure.

Crankshaft damper, pitch diameter $D_{CR}=200$ [mm]
    Torque measured at AC, $Q_{AC}=-30$ [N-m]
        Pitch diameter $D_{AC}=180$ [N-m]
    Torque measured at AL, $Q_{AL}=-20$ [N-m]
        Pitch diameter $D_{AL}=60$ [mm]
    Torque measured at PA, $Q_{PA}=-15$ [N-m]
        Pitch diameter $D_{PA}=150$ [mm]
    Torque measured at WP, $Q_{WP}=-5$ [N-m]
        Pitch diameter $D_{WP}=100$ [mm]

As noted previously, the "+" sign designates a driver torque and the "−" sign designates a driven accessory torque.

Equation (3) is used to calculate the driver torque (crankshaft torque) as:

$$Q_{CR}=200/180*30+200/60*20+200/150*15+200/100*5=+130 \text{ [mm]}$$

Using the equation (2), the incremental tension in each belt span is calculated as:

$$T34=2*130*1000/200=+1300 \text{ [N]}$$

$$T45=2*30*1000/180=-333 \text{ [N]}$$

$$T56=2*20*1000/60=-667 \text{ [N]}$$

$$T61=2*15*1000/150=-200 \text{ [N]}$$

$$T23=2*5*1000/100=-100 \text{ [N]}$$

The "1000" term is simply derived from unit conversion, namely:

$$1.0 \text{ N-m}=1000.0 \text{ N-mm}.$$

The wrap angle at the tensioner idler IDL is $\theta=60°$. The hubload measured by the hubload transducer at IDL is H=350 [N].

Using equation (1), the belt tension at span 1 and span 2 is calculated as:

$$T1=T2=H/[2*\sin(\theta/2)]=350 \text{ [N]}$$

Therefore, the adjacent span tensions can be calculated as:

$$T3=T2+T23=350-100=250 \text{ [N]}$$

$$T4=T3+T34=250+1300=1550 \text{ [N]}$$

$$T5=T4+T45=1550-333=1217 \text{ [N]}$$

$$T6=T5+T56=1217-667=550 \text{ [N]}$$

$$T1=T6+T61=550-200=350 \text{ [N]}$$

Torque Transducer

Figure 9:
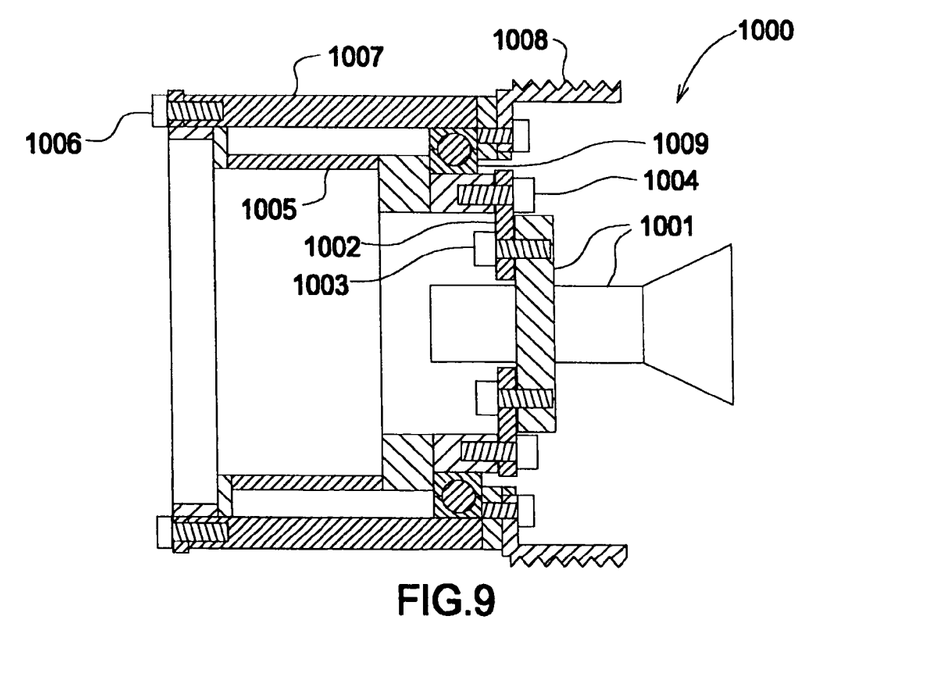
FIG. 9 is a cross-sectional view of a torque transducer.

FIG. 9 is a cross-sectional view of a torque transducer. Torque sensor 1000 is shown connected to a shaft 1001. Shaft 1001 is a rotating shaft for power (torque) input to a driven accessory such as AC, AL, WP, PA, or power output (torque) from a driver such as a crankshaft CRK. Sensor 1000 comprises ring 1002 which is used to fasten the transducer to shaft 1001 using threaded fasteners 1003. Ring 1002 is also fastened to strainable cylindrical body 1005. Strainable cylindrical body 1005 is in turn fastened to belt engaging ring 1007. Belt engaging ring 1007 also comprises belt engaging portion 1008. Portion 1008 is shown with a multiple-ribbed profile. Portion 1008 can also comprise a flat or single groove (v-belt) profile depending upon the belt used in the belt drive system.

Strainable cylindrical body 1005 is sufficiently thin so as to be torsionally strainable when subjected to an operational torque load. Body 1005 may comprise any material with sufficient strength and toughness to survive the torque transmitting service while being sufficiently flexible to strain without failing when under operational loads. Acceptable materials include plastic as well as metallic materials, including aluminum, steel, titanium, magnesium, and alloys and combinations thereof. The materials are selected based on the operational requirements of the system.

On the other hand, ring 1002, ring 1007 and portion 1008 are each sufficiently rigid as compared to body 1005 so that substantially all of the strains in ring 1002, ring 1007 and portion 1008 are insignificantly small as compared to the strain in cylindrical body 1005. It is desirable that substantially all strain in the torque transducer be manifest in cylindrical body 1005. This maximizes the strain to be detected by the strain gages thereby maximizing the resistance change in the strain gages, which in turn optimizes the voltage change as detected by attached instrumentation.

A low friction bearing 1009 is disposed between ring 1007 and portion 1008 and cylindrical body 1005. Bearing 1009 simultaneously radially supports ring 1007 and portion 1008 while preventing ring 1007 from becoming torsionally fixed with respect to ring 1002, thereby confining all torque to be transmitted through cylindrical body 1005. Bearing 1009 may comprise any suitable low friction bearing known in the art, including but not limited to ball, needle, and roller bearings. Lubricated, low friction sliding surfaces may also be used in lieu of bearings.

Figure 10:
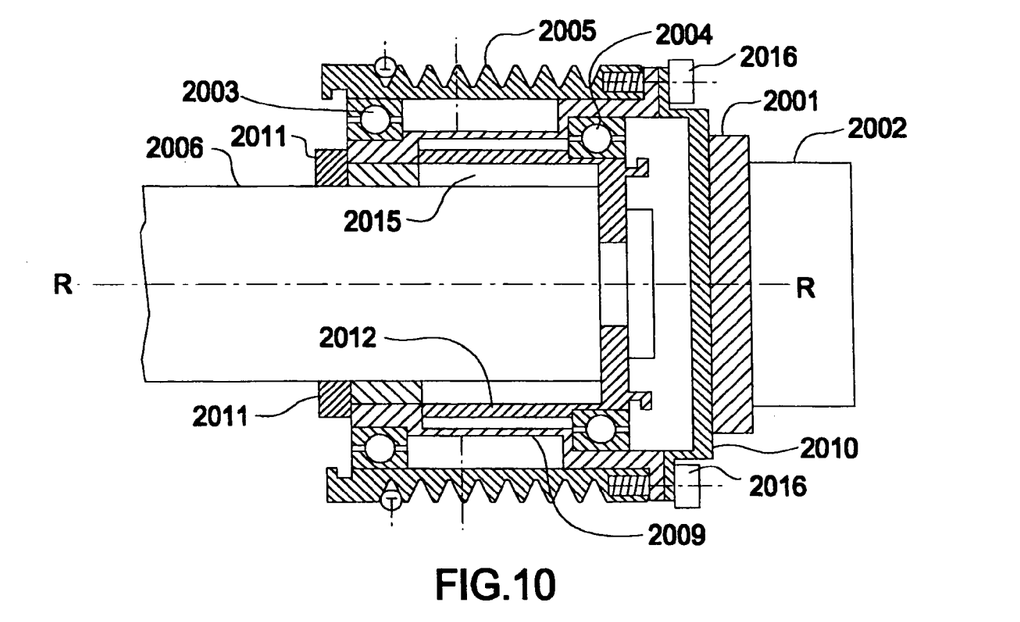
FIG. 10 is a cross-sectional view of an alternate embodiment of the torque transducer.

FIG. 10 is a cross-sectional view of an alternate embodiment of the torque transducer. A signal conditioner 2002 and slip ring 2001 used in the inventive torque transducer are known in the art, for example, a one piece unit provided by Michigan Scientific, Inc., part no. Short S6/X/SG1. The slip ring 2001 is shown cooperating with adapter 2012. Component shaft 2006 is connected to adapter 2012 using key 2015. Adapter 2012 is connected to strainable cylindrical body 2009 by fasteners 2011. Bearings 2003 and 2004 support the belt bearing surface 2005 at each end while allowing strains to be isolated in the cylindrical body 2009. Adapter plate 2010 connects slip ring/signal conditioner to the cylindrical body 2009 using fasteners 2016. The strain gage configuration adhered to a surface of cylindrical strainable body 2009 may comprise any of those depicted in FIGS. 12 thru 15.

Figure 11:
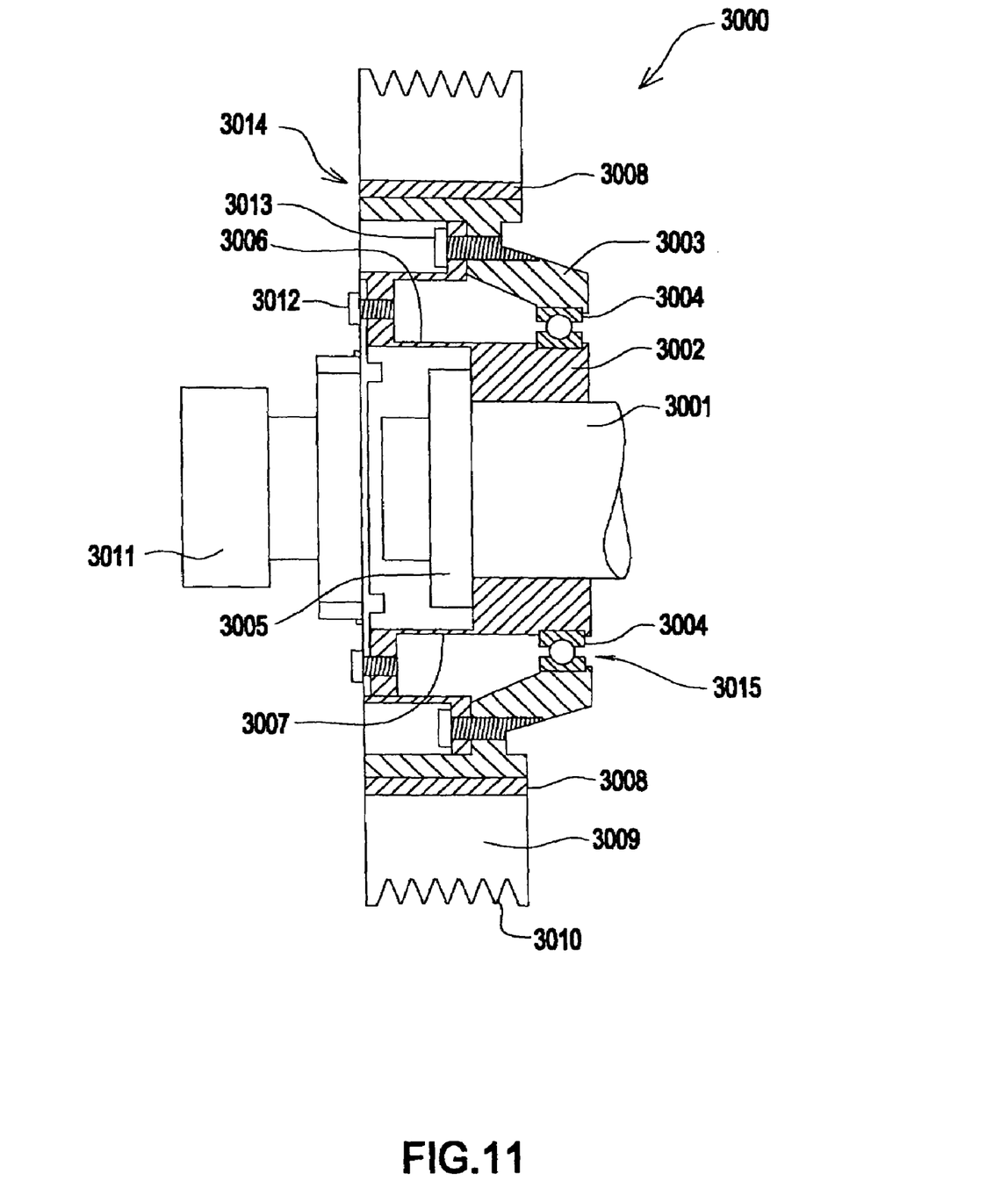
FIG. 11 is a cross-sectional view of an alternate embodiment of the torque transducer.

FIG. 11 is a cross-sectional view of an alternate embodiment of the torque transducer. Hub 3002 is connected to crankshaft 3001 using bolt 3005. Crankshaft 3001 is part of an automotive engine (not shown). Hub 3002 comprises strainable cylindrical or tubular portion 3006. Strain gages are attached to tubular portion surface 3007 as described in FIGS. 12-15 herein. Strainable tubular portion 3006 is connected to outer ring 3003 by bolts 3013. A known slip ring and signal conditioner 3011 is connected to tubular portion 3006 by bolts 3012. Portion 3006 and outer ring 3003 may also be machined or manufactured as a single unit thereby eliminating the need for bolts 3012 and 3013 and thereby reducing an overall component weight.

A bearing 3004 is disposed between outer ring 3003 and hub 3002 in annular space 3015. Annular space 3015 and bearing 3004 are radially disposed from crankshaft 3001 to optimize a torsional strain on tubular portion 3006. When subjected to a torque bearing 3004 allows outer ring 3003 to rotate slightly with respect to hub 3002, thereby straining tubular portion 3006 in proportion to the applied torque. A sufficiently high modulus for outer ring 3003 assures that all torque related strains are substantially isolated to tubular portion 3006. Bearing 3004 supports tubular portion 3006 to prevent it from unduly deforming or twisting under load. Bearing 3004 comprises a sealed ball bearing. In the case where tubular portion 3006 and outer ring 3003 comprise a single unit, bearing 3004 is installed by a press fit.

Elastomeric member 3008 is disposed between outer ring 3003 and belt bearing member 3009. Elastomeric member 3008 may comprise any natural rubber or synthetic rubber or any combination thereof, including but not limited to HNBR and or EPDM. Member 3008 is retained between member 3009 and outer ring 3003 by adhesives known in the art or by being compressed in the annular space 3014, or by a combination thereof. Compression of elastomeric member 3008 is in the range of 20% to 70% of an uncompressed thickness.

Elastomeric member 3008 damps crankshaft vibrations caused by rotation of the crankshaft and operation of the engine. Damping vibrations in this manner reduces wear on the belt drive system driven by the crankshaft, thereby increasing a useful life of the system components and reducing transmission of undesirable noise and vibration to a vehicle frame and occupant. Belt bearing member 3009 has a multiple-ribbed profile 3010 for engaging a multiple-ribbed belt.

An integrated slip ring and signal conditioner 3011 of the type described in FIG. 10 is connected to hub 3002 with bolts 3012. The inventive torque transducer is sufficiently compact so it is useable in the same size volume as currently required by a crankshaft damper.

Figure 12:
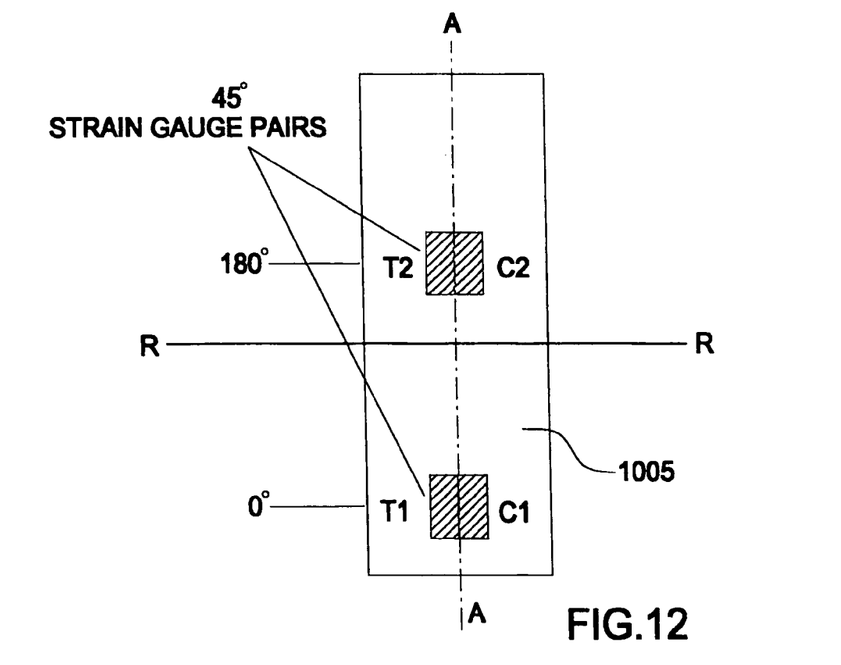
FIG. 12 is a schematic diagram of a single full bridge strain gage installation as disposed on a strainable member.

FIG. 12 is a schematic diagram of a single full bridge strain gage installation as disposed on a strainable member. Cylindrical body 1005 is shown "unrolled" in plan view with cylindrical positions marked as 0° and 180°. An axis of rotation is R—R. A 45° strain gage pair T1C1 and T2C2 are shown at positions 0° and 180° on an outwardly disposed surface of body 1005. The term "45°" refers to the angular relationship of each strain gage major axial direction to axis A—A. Axis A—A is disposed at an angle of 90 degrees to axis R—R. The angular relationship affords maximum sensitivity for detecting a torsional strain since the strain gage axis is substantially aligned with a predominant strain direction. The angle may be in the range of approximately 40°–50° with acceptable result. The depictions in FIGS. 12–15 are also representative of the strain gage configuration on tubular portion 3006.

Figure 13:
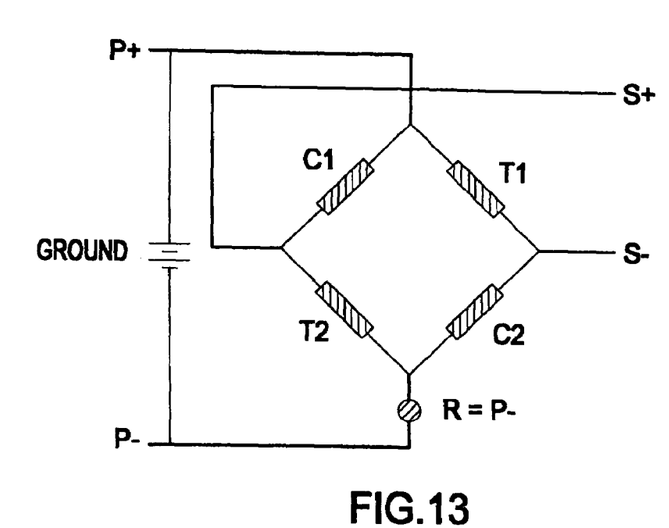
FIG. 13 is a schematic diagram of a single full bridge strain gage installation with bipolar excitation.

FIG. 13 is a schematic diagram of a single full bridge strain gage installation with bipolar excitation. Strain gages T1, T2, C1, C2 each comprise known resistances suitable for the service. Each is bonded to the surface of the cylindrical body 1005 as shown in FIG. 11. Deformation of body 1005 is proportional to the torque transmitted by the pulley/sensor combination. The signal to the strain gage signal conditioner and connected instrumentation module is denoted S+ and S−. The voltage source is denoted P+ and P−.

Figure 14:
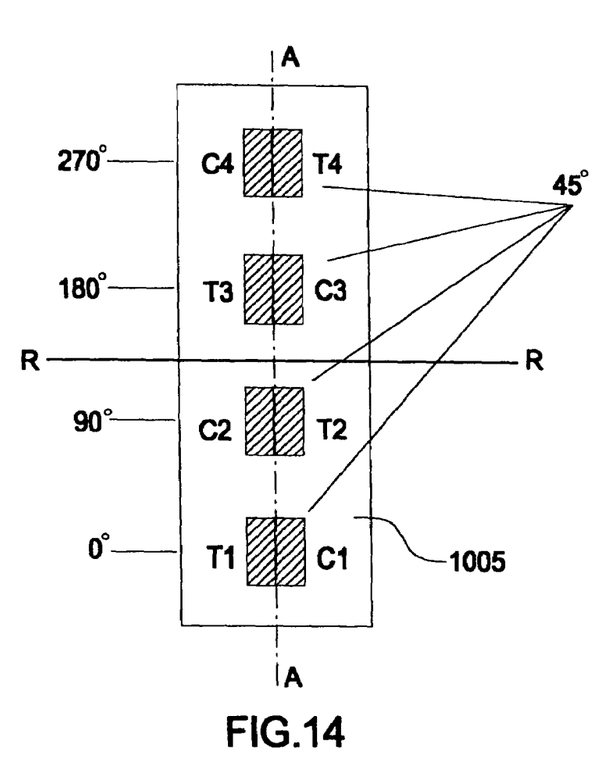
FIG. 14 is a schematic diagram of a double bridge strain gage installation as disposed on a strainable member.

FIG. 14 is a schematic diagram of a double bridge strain gage installation disposed on a strainable member. Cylindrical body 1005 is shown "unrolled" in plan view with cylindrical positions marked as 0°, 90°, 180°, and 270° on an outwardly disposed surface of body 1005. 45° strain gage pairs are disposed as follows: T1C1 at 0°, T2C2 at 90°, T3C3 at 180°, and T4C4 at 270°. Strain gages T1, T2, T3, T4, C1, C2, C3, C4 each comprise known resistances suitable for the service. Each strain gage is bonded to the surface of the cylindrical body 1005 as shown in FIG. 13 whereby body 1005 strains are measured, which are directly proportional to the torque being transmitted by the pulley/sensor combination. As noted in FIG. 12, the term "45°" refers to the angular relationship of each strain gage major axial direction to axis A—A. Axis A—is disposed at an angle of 90 degrees to axis R—R. This affords maximum sensitivity for detecting a torsional strain since the strain gage axis is substantially aligned with a predominant strain direction. The angle may be in the range of approximately 40°–50° with acceptable result.

Figure 15:
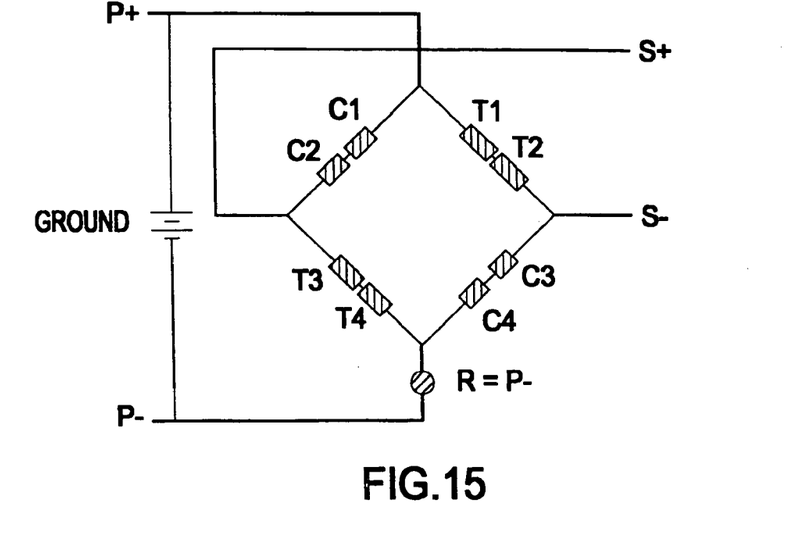
FIG. 15 is a schematic diagram of a double bridge strain gage installation with bipolar excitation.

FIG. 15 is a schematic diagram of a double bridge strain gage installation with bipolar excitation. The double bridge strain gage affords increased sensitivity for detecting small strains. The signal to the strain gage signal conditioner and instrumentation module is denoted S+ and S−. The voltage source is denoted P+ and P−.

The inventive system and components can be used in existing vehicle front-end accessory drives with a minimum of modification. The hubload transducer fits within an idler pulley. The torque transducers offer great flexibility as each can be either installed as original equipment or retrofitted to existing torque transmitting accessory pulleys and crankshaft.

Figure 16:
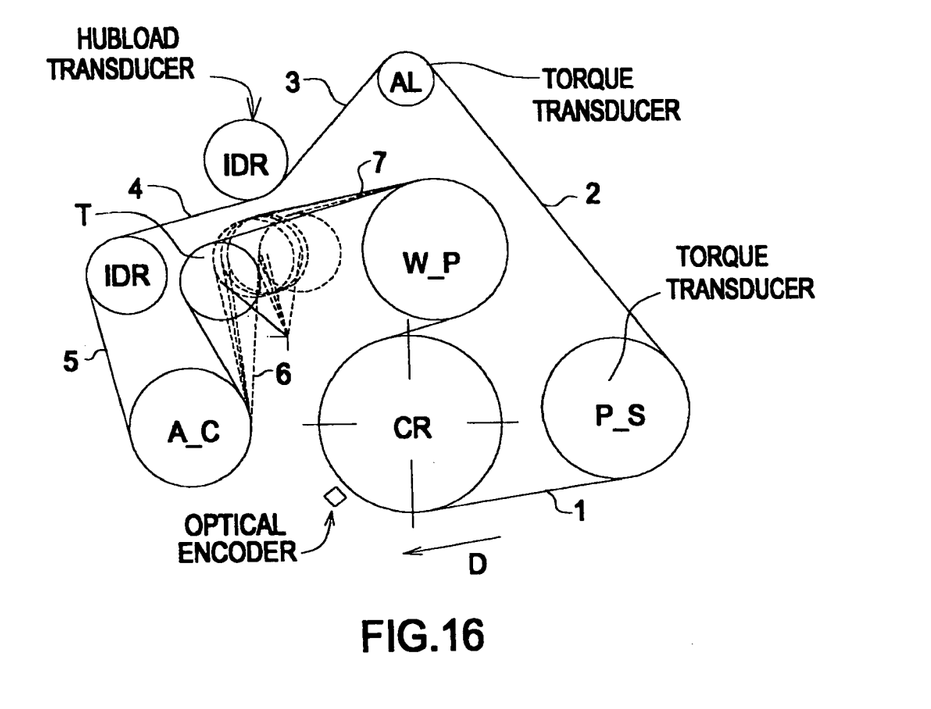
FIG. 16 is a schematic of a test belt drive system.

FIG. 16 is a schematic of a test belt drive system. In this exemplary system, a torque transducer is installed at the P_S, power steering, and ALT, alternator pulley. A hubload transducer is installed at the idler (IDL) pulley. The belt is driven in direction D by crankshaft pulley CRK. Of course, a user may instrument (n−1) pulleys using a hubload transducer and torque transducers where (n) is the total number of pulleys. The system in FIG. 15 comprises n=8 pulleys.

Layout data for the test system in FIG. 16 is as follows:

| Layout Data [mm] | | | | |
|---|---|---|---|---|
| | X Coordinate | Y Coordinate | Flat Diameter | Pitch Diameter | Layout #1 Effective Diameter |
| CRK | 0.00 | 0.00 | | 170.31 | 168.31 |
| P_S | 191.20 | 19.80 | | 139.97 | 137.97 |
| AL1 | −7.00 | 335.00 | | 53.31 | 51.31 |
| IDR | −158.00 | 253.50 | 76.00 | 78.40 | 80.40 |
| IDR | −266.60 | 139.25 | | 78.71 | 76.71 |
| A_C | −207.10 | −7.40 | | 116.02 | 114.01 |
| TEN | −142.96 | 160.56 | 76.00 | 78.40 | 80.40 |
| W_P | 22.00 | 172.00 | 129.00 | 131.40 | 133.40 |

| Belt Drive System Geometry | | | |
|---|---|---|---|
| | Span Length [mm] | Wrap Angle Acceler. | Speed Ratio (Ref. Engine) |
| CRK | 191.6 | 168.2 | 1.000 |
| P_S | 369.8 | 118.4 | 1.217 |
| AL1 | 158.4 | 102.1 | 3.195 |
| IDR | 136.7 | 34.4 | 2.172 |
| IDR | 157.2 | 88.8 | 2.164 |
| A_C | 151.3 | 176.5 | 1.468 |
| TEN | 163.2 | 88.6 | 2.172 |
| W_P | 85.5 | 170.9 | 1.296 |

The respective tensions are calculated using the following equations.

$$H_{idler} = \text{Measured}$$

$$H_{Alt} = \sin\left(\frac{\theta_{Alt}}{2}\right)(T_{idler} + T_{Alt})$$

$$H = \sin\left(\frac{\theta_{PS}}{2}\right)(T_{Alt} + T_{PS})$$

$$T_3 = T_4 = \frac{H_{idler}}{2\sin\left(\frac{wrap_{idler}}{2}\right)}$$

$$T_2 = T_3 + \frac{Q_{Alt}}{\phi_{Alt}/2}$$

$$T_1 = T_2 + \frac{Q_{PS}}{\phi_{PS}/2}$$

$T$ = Tension, $H$ = Hubload, $Q$ = Torque, $\phi$ = Diameter $\theta$ = wrap angle For the purpose of illustration and not of limitation, a sample calculation comprises:

$$T_3 = T_4 = \frac{192.63N}{2\sin\left(\frac{34.4}{2}\right)} = 325.7N$$

$$T_2 = 325.7 + \frac{5.206}{\frac{0.05331}{2}} = 521.0N$$

$$T_1 = 521.0 + \frac{16.372}{\frac{0.13997}{2}} = 754.9N$$

To calculate the drive efficiency, the rotational speed needs to be measured as well in order to determine this quantity. As for above example, the torque at crankshaft should be measured directly using the torque transducer instead of being calculated:

Qcr=+135 [N-m], rotational speed @ crankshaft CR=1000 rpm
Qac=−30 [N-m], rotational speed @ air conditioning AC=1100 rpm
Qal=−20 [N-m], rotational speed @ alternator AL=3300 rpm
Qpa=−15 [N-m], rotational speed @ power steering PA=1300 mm
Qwp=−5 [N-m], rotational speed @ water pump WP=2000 mm.

The drive efficiency is calculated as:

$$\eta = \text{abs}([Q_{AC}*AC+Q_{AL}*AL+Q_{PA}*PA+Q_{WP}*WP]/[Q_{CR}*CR])*100\%$$
$$= |(30*1100+20*3300+15*1300+5*2000)/(135*1000)*100|$$
$$\eta = 95.19\%$$

Figure 17:
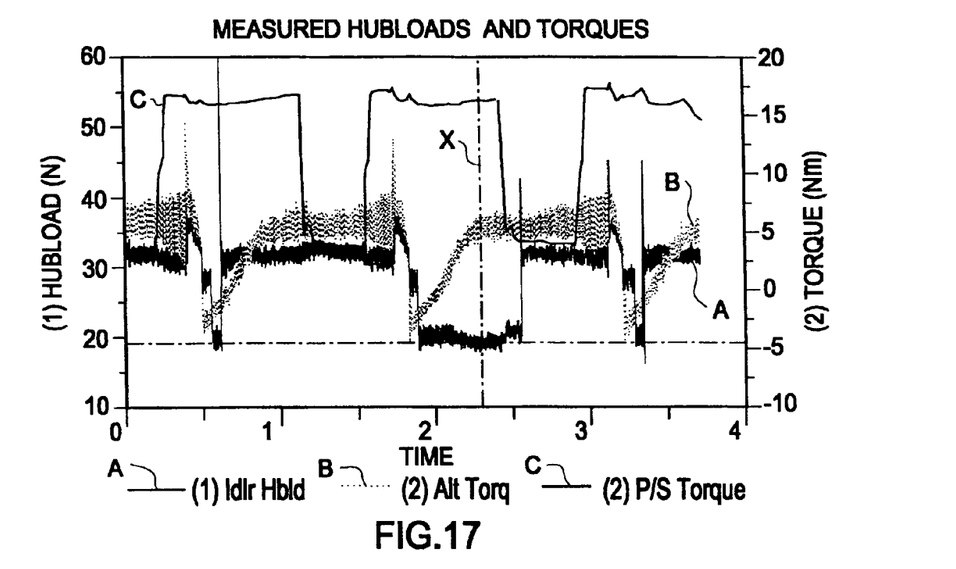
FIG. 17 is a graph showing measured hubloads and torques at each time step for the test belt drive system.

FIG. 17 is a graph showing measured hubload and torques for the test belt drive system. The sample belt span tension calculations performed above are taken at time step 23 seconds. Although torques $T_1$, $T_2$, $T_3$, and $T_4$ can be calculated at each time step, time step 23 is chosen randomly. Curve (A) is the idler hubload. Curve (B) is the alternator torque and curve (C) is the power steering pump (P/S) torque. The values for each are measured by the instrumentation described in this specification and as illustrated in FIG. 16.

The test system is subjected to three load/unload cycles. From time 0 to approximately time 4 seconds, the alternator torque and idler hubload are substantially constant. At approximately time 2 seconds the power steering torque increases, corresponding to an increase in load. The load holds substantially constant to approximately time 11 seconds. From approximately time 4 seconds to time 5 seconds the alternator torque decreases. At time 5 seconds the alternator torque steadily increases through time 9 seconds, where it levels off. At approximately time 4 seconds the hubload decreases through time 6 seconds. At time 6 seconds it abruptly increases to the value measured at time 4 seconds. At time 11 seconds the cycle repeats through time 25 seconds, and repeats yet again through time 37+ seconds.

Figure 18:
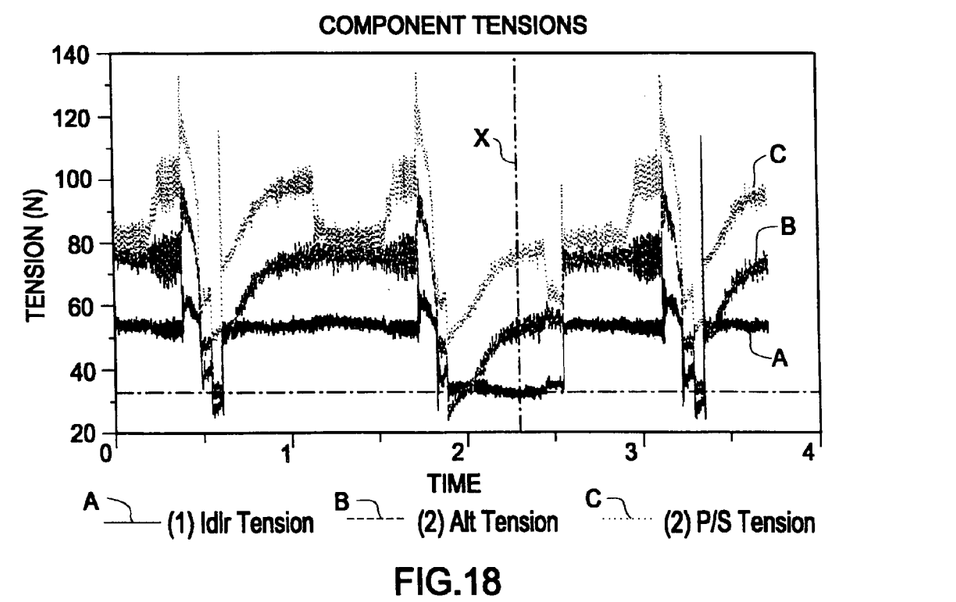
FIG. 18 is a graph of the calculated component tensions at each time step for the belt test drive system.

FIG. 18 is a graph of the calculated tensions at each time step for the test belt drive system. Cursor X is placed at the 23 second mark to correlate and illustrate results from FIG. 16. Curve (A) is the idler tension, $T_4$. Curve (B) is the alternator tension, $T_3$, and curve (C) is the power steering pump (P/S) tension, $T_2$. The calculations described herein are preferably performed using a computer programmed to perform the calculations. The computer programming is accomplished using known methods.

The progression of each of the cycles described in FIG. 17 is clearly observed in FIG. 18. For example, since the idler does not transmit a torque, the idler belt span tension in span 3 and span 4 as shown in FIG. 16 corresponds to the idler hubload shown in FIG. 17. The belt tension in span 2 (curve (B)) is a function of the alternator torque, see FIG. 17. The belt tension in span 1 (curve (C)) is a function of the alternator torque and the power steering torque, see FIG. 17.

One can appreciate that the system and method described herein can be used to instrument all of the pulleys with torque transducers, excepting the idler pulley which is fitted with a hubload transducer since the idler pulley transmits no torque.

Although forms of the invention have been described herein, it will be obvious to those skilled in the art that variations may be made in the construction and relation of parts without departing from the spirit and scope of the invention described herein.

We claim:

1. A torque transducer comprising:
a cylindrical strainable member having a surface and a first portion and a second portion;
the first portion connectable to a shaft;
the second portion connected to a belt bearing portion;
a low-friction bearing disposed between the belt bearing portion and the cylindrical strainable member for substantially isolating a torque induced strain on the surface;
at least one strain gage mounted on the surface, the strain gage generating a signal proportional to the torque induced strain;
a slip ring engaged with the cylindrical strainable member for receiving the signal; and
a signal conditioner electrically disposed between the strain gage and the slip ring.

2. The torque transducer as in claim 1 further comprising a damping member disposed between the belt bearing portion and cylindrical strainable member.

3. The torque transducer as in claim 1, wherein the low-friction bearing comprises a ball bearing.

4. The torque transducer as in claim 1, wherein the belt bearing portion comprises a multiple-ribbed profile.

5. The torque transducer as in claim 1 further comprising a plurality of strain gages mounted to the surface and disposed in a full bridge electrical configuration.

6. The torque transducer as in claim 1, further comprising a second strain gage mounted to the surface and cooperatively connected to the strain gage.

7. The torque transducer as in claim 1, wherein a strain gage axis is disposed at an angle in the range of approximately 40–50 degrees to a cylindrical strainable member rotational axis (R—R).

8. The torque transducer as in claim 2 wherein the damping member comprises an elastomeric material.

* * * * *